United States Patent [19]

Slivka et al.

[11] Patent Number: 4,832,103
[45] Date of Patent: May 23, 1989

[54] PNEUMATIC TIRE HAVING PLURAL ARAMID CARCASS PLIES

[75] Inventors: John J. Slivka, Bath Township, Summit County, Ohio; Thomas N. H. Welter, Keispelt, Luxembourg

[73] Assignee: The Goodyear Tire & Rubber Company, Akron, Ohio

[21] Appl. No.: 156,624

[22] Filed: Feb. 17, 1988

[51] Int. Cl.$^4$ ................................................ B60C 9/09
[52] U.S. Cl. ................................. 152/559; 152/548; 152/561
[58] Field of Search ................ 152/548, 552, 556–561

[56] References Cited

U.S. PATENT DOCUMENTS

| | | | |
|---|---|---|---|
| 2,432,630 | 12/1947 | Purdy | 152/556 |
| 2,703,128 | 3/1955 | Darrow | 152/557 |
| 2,782,830 | 2/1957 | Wallace | 152/527 |
| 3,165,138 | 1/1965 | Manchetti et al. | 152/561 X |
| 3,442,315 | 5/1969 | Mirtain | 152/556 |
| 3,770,041 | 11/1973 | Abbott | 152/454 |
| 4,177,852 | 12/1979 | Merli et al. | 152/550 |
| 4,469,157 | 9/1984 | Morikawa et al. | 152/561 X |

FOREIGN PATENT DOCUMENTS

| | | | |
|---|---|---|---|
| 0172294 | 2/1986 | European Pat. Off. | |
| 174147 | 3/1986 | European Pat. Off. | 152/552 |
| 2590207 | 5/1987 | France | |

Primary Examiner—Michael W. Ball
Assistant Examiner—Geoffrey L. Knable
Attorney, Agent, or Firm—L. R. Drayer

[57] ABSTRACT

A pneumatic tire (10) has adjacent carcass plies (13, 14, 15) which are reinforced by cables comprising aramid filaments. The amount of strength retained by the cables over a period of normal use of the tire is increased when for each pair of adjacent carcass plies: (a) the cables of the radially innermost of said carcass plies intersect the mid-circumferential plane (CP) of the tire at a first angle in the range of 75° to 105° and the cables of the radially outermost of said carcass plies intersect the mid-circumferential centerplane (CP) at a second angle in the range of 75° to 105°; (b) said second angle is nearer to 90° than said first angle; and (c) the included angle between said first and second angles is not greater than 10°.

3 Claims, 4 Drawing Sheets

PNEUMATIC TIRE HAVING PLURAL ARAMID CARCASS PLIES

The present invention relates to radial ply tires having at least two carcass plies reinforced with cables containing aramid filaments.

It is generally recognized in the tire art that most aramid cables are unsatisfactory in their resistance to flex and cyclic fatigue, largely due to their characteristically high modulus. In the past, pneumatic tires having more than one carcass ply of aramid cords have been generally recognized as being unsatisfactory in compression and fatigue performance. As used herein and in the appended claims, "aramid" and "aromatic polyamide" are both understood to mean a manufactured fiber in which the fiber-forming substance is generally recognized as a long-chain synthetic aromatic polyamide in which at least 85% of the amide linkages are attached directly to two aromatic rings. Representative of an aramid or aromatic polyamide is a poly(p-phenyleneterphthalamide).

There is provided in accordance with the one aspect of the present invention a pneumatic tire comprising: (a) a pair of axially spaced apart annular beads: and (b) a pair of carcass plies each of which extends between said beads and is folded thereabout, said carcass plies being adjacent to one another in both a crown region and sidewall portion of the tire, each said carcass ply comprising side-by-side cables comprising aramid filaments, the cables of the radially innermost of said carcass plies intersecting a mid-circumferential centerplane of the tire at a first angle in the range of 75° to 105° and the cables of the radially outermost of said carcass plies intersecting said mid-circumferential centerplane at a second angle of the range of 75° to 105°, said second angle being nearer to 90° than said first angle, and the included angle between said first and second angles being not greater than 10°.

There is provided in accordance with a second aspect of the invention a pneumatic tire suitable for use on an aircraft wherein said tire comprises: (a) a pair of axially spaced apart annular beads: and (b) a pair of carcass plies each of which extends between said beads and is folded axially and radially outwardly about each of the beads, said carcass plies being adjacent to one another in both a crown region and two sidewall portions of the tire, each said carcass ply comprising side-by-side cables with each said cable consisting of aramid filaments, the cables of the radially innermost of said carcass plies intersecting a mid-circumferential plane of the tire at a first angle in the range of 80° to 90° and the cables of the radially outermost of said carcass plies intersecting said mid-circumferential centerplane at a second angle in the range of 80° to 90°, the difference between said second angle and 90° being less than th difference between said first angle and 90°.

There is provided in accordance with yet another aspect of the invention a pneumatic tire suitable for use on an aircraft wherein said tire comprises: (a) a pair of axially spaced apart annular beads: and (b) a pair of carcass plies each of which extends between said beads and is folded radially and axially outwardly about each of the beads, said carcass plies being adjacent to one another in both a crown region and two sidewall portions of the tire, each said carcass ply comprising side-by-side cables with each said cable consisting of aramid filaments, the cables of the radially innermost of said carcass plies intersecting a mid-circumferential plane of the tire at first angle in the range of 90° to 100° and the cables of the radially outermost of said carcass plies intersecting said mid-circumferential centerplane at a second angle in the range of 90° to 100°, the difference between said second angle and 90° being less than the difference said first angle and 90°.

The features of the invention which are believed to be novel are set forth with particularity in the appended claims. The present invention, both as to its structure and manner of operation, may best be understood by reference to the following detailed description, taken in accordance with the accompanying drawings in which:

FIG. 1 is a cross-sectional view of a tire according to the invention taken along a plane that contains the axis of rotation of the tire: and FIGS. 2 to 6 are diagrammatic representations of the angular orientations of the cables in the carcass plies of a tire according to the invention.

Referring first to FIG. 1, there is shown in cross section a tire 10 manufactured in accordance with the present invention. While the tire illustrated in FIG. 1 in an aircraft tire, it is understood that the invention may be practiced with respect to tires intended for other applications also, such as truck tires, agricultural tires, and tires used on construction equipment. As used herein and in the claims, a tire is an "aircraft tire" or "suitable for use on an aircraft" if the tire is of a size and load range, or ply rating, specified for an aircraft tire in either the YEARBOOK OF THE TIRE AND RIM ASSOCIATION or in the YEARBOOK OF THE EUROPEAN TYRE AND RIM TECHNICAL ORGANISATION, for the year in which the tire is manufactured, or in the then current U.S. military specification "MIL-T-5041".

With reference to FIG. 1, an aircraft tire 10 of size 46×16 R 20 according to a preferred embodiment of the invention has a pair of substantially inextensible annular bead cores 11,12 which are axially spaced apart with two or more carcass plies 13,14,15 extending between the bead cores.

As used herein and in the claims, the terms "axial" and "axially" refer to directions which are parallel to the axis of rotation of a tire, and the terms "radial" and "radially" refer to directions that are perpendicular to the axis of rotation of a tire. Each of the carcass plies 13,14,15 comprises a plurality of cables oriented at 75° to 105°, preferably 80° to 100°, with respect to a mid-circumferential plane CP of the tire. A tire in accordance with the present invention is commonly referred to as a radial ply tire. As used herein and in the claims, the "mid-circumferential plane" of a tire is a plane that is perpendicular to the axis of rotation of the tire and is located midway between the sidewalls of tee tire when the tire is not subjected to any load. In the example illustrated in FIG. 1 the carcass plies comprise two turn-up carcass plies 13,14 and a turn-down carcass ply 15. Each of the turn-up carcass plies 13,14 is folded axially and radially outwardly about each of the bead cores 11,12 and the turn-down carcass ply 15 is folded radially and axially inwardly about each of the bead cores 1,,12 and the turn-up carcass plies 13,14. Each of the carcass plies 13,14,15 comprises a plurality of side-by-side cables with each of said cables comprising aramid filaments, and preferably consisting of only aramid filaments. As used herein and in the claims with respect to cables "consists of", "consisting of" or "consisting of only" is understood to mean that no filaments of any material other than aramid are present in a cable. As used herein and in the claims with respect to cables "comprises" and "comprising" are understood to mean that filaments of a material other than aramid may be present in a cable along with aramid filaments.

If the tire is of the tubeless variety, a substantially air impervious layer 52 is disposed inwardly of all of the carcass plies 13,14,15. Most preferably a barrier ply (not shown) is disposed between the air impervious layer 52 and the innermost carcass ply 13. The barrier ply functions to separate the air impervious layer from the elastomeric material in which the cables of the carcass ply 13 are embedded. Tires have been manufactured according to the invention having a barrier ply comprising cables of 840/1 nylon.

A belt structure 30 comprising two or more belt plies 31–35 is disposed radially outwardly of all of the carcass plies 13,14,15 in a crown region of the tire. A ground engaging tread portion 37 is disposed radially outwardly of the belt structure 30, and a sidewall portion 16,17 extends radially inwardly from each axial edge of the tread portion to a respective bead portion 18,19. In the embodiment illustrated in FIG. 1 one of the belt plies 31 is folded and the remainder of the belt plies 32–35 are unfolded. One or more wraps 30 of a restricting band of nylon cords oriented at 0° to 25° with respect to the mid-circumferential CP may be interposed between the belt structure 30 and the tread portion 37. It is understood that the particular belt structure illustrated in FIG. 1 and described herein is merely an example used in a preferred embodiment and that a tire designer may employ any arrangement of folded or unfolded belt plies in accordance with the performance requirements of a particular tire while still practicing the present invention.

It is believed that when two adjacent carcass plies of cables containing aramid filaments are subjected to repeated cycles of deformations the stresses to which each of the plies are subjected are different. As used herein and in the claims, two carcass plies are understood to be adjacent to one another if no cords or cables are interposed between the two carcass plies in the crown portion or sidewalls of the tire, although other cord reinforced components may be interposed between carcass plies in a bead region 18,19 and still allow the plies to be adjacent to one another for purposes of this invention.

Applicants have discovered that in a tire having adjacent carcass plies which are reinforced by cables comprising or consisting of aramid filaments, the strength retained by the cables of the plies over a period of normal use of the tire will be increased if:

(a) the cables of the radially innermost of said carcass plies intersects the mid-circumferential plane of the tire at a first angle in the range of 75° to 105° and the cables of the radially outermost of said carcass plies intersects the mid-circumferential plane at a second angle in the range of 75° to 105°;

(b) said second angle is nearer to 90° than said first angle, or put another way, the difference between said second angle and 90° is less than the difference between said first angle and 90°: and (c) the included angle between said first and second angles is not greater than 10°, and preferably not greater than 2°.

Most preferably these relationships are true for each pair of adjacent turn-down and/or turn-up carcass plies in a tire.

The parameters set forth in the preceding paragraph are illustrated in FIGS. 2 to 6 which are schematic representations of cables of any two adjacent carcass plies in a crown portion of a tire. In each of FIGS. 2 to 6, the reference characters have meanings as follows.

CP represents the mid-circumferential plane of a tire:
A represents a cable of the radially innermost of the two adjacent carcass plies:
B represents a cable of the radially outermost of the two carcass plies:
α represents the angle at which cable A is oriented with respect to the mid-circumferential plane CP:
β represents the angle at which cable B is oriented with respect to the mid-circumferential plane CP: and
θ represents the included angle between cables A and B.

FIG. 2 is illustrative of an embodiment in which α is less than 90° and β is greater than 90°, or in other words, both α and β are in the range of 75° to 105°, preferably in the range of 85° to 95°. If, for example, α is 76° and β is 96°, the included angle θ is 20° and the tire would not be within the scope of the present invention. However, for example, if α is 84° and β is 92° included angle θ is 8° and the tire would be within the scope of the present invention. It is necessary to bear in mind that if the absolute value of the difference between β and 90° is not less the absolute value of the difference between α and 90° the tire will not be within the scope of the invention.

FIG. 3 is illustrative of an embodiment in which both α and β are greater than 90°, or in other words both α and β are in the range of 90° to 105° preferably 90° to 100°. If, for example, α is 93° and β is 104° included angle θ is 11° and the tire would not be within the scope of the present invention. However, for example if α is 98° and β is 92° included angle θ is 6° and the tire would be within the scope of the invention.

FIG. 4 is illustrative of an embodiment in which both α and β are less than 90°, or in other words both α and β are in the range of 75° to 90°, preferably 80° to 90°. If, for example, α is 88° and β is 84° the tire will not be within the scope of the invention, even though included angle θ is less than 10°, because α is nearer to 90° than is β. However, if α is 84° and β is 88°, the tire will be within the scope of the invention.

Figure 1:
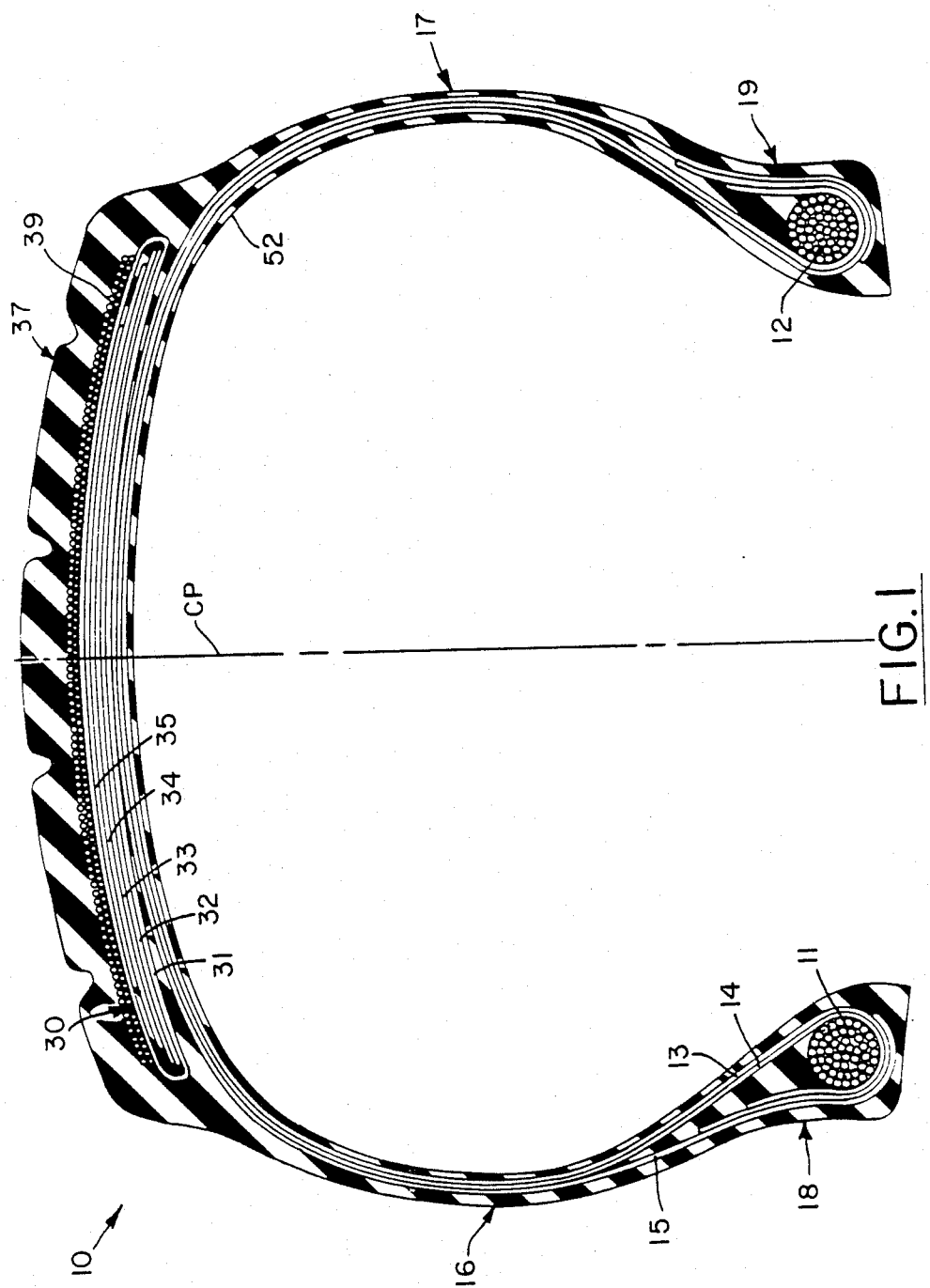
Figure 2:
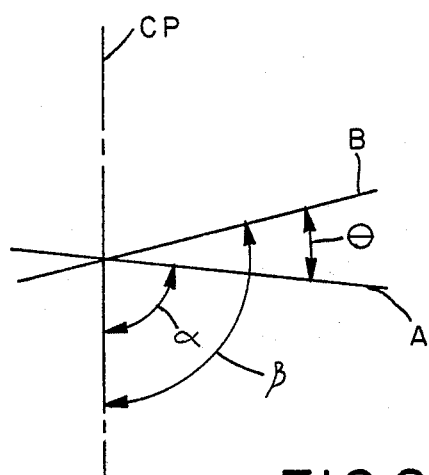
Figure 3:
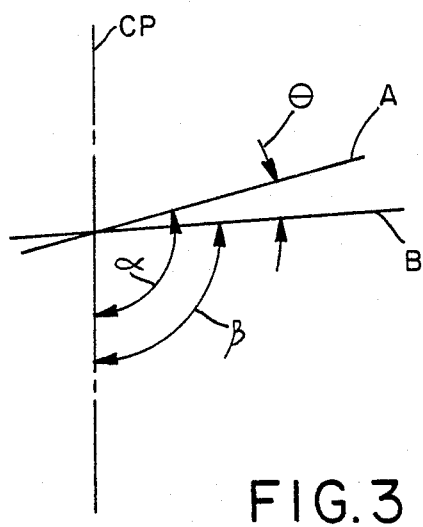
Figure 4:
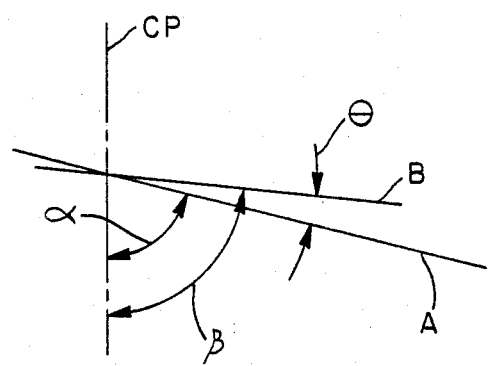
Figure 5:
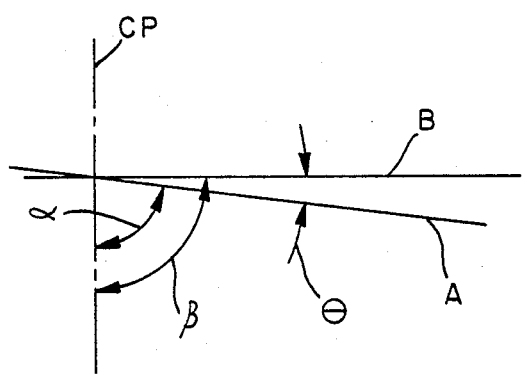
FIG. 5 is illustrative of an embodiment in which β is 90° and β is less than 90° but not less than 80°.
Figure 6:
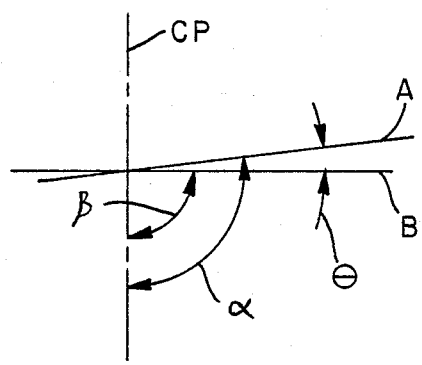
FIG. 6 is illustrative of an embodiment in which β is 90° and α is greater than 90° but not greater than 100°.

Tires according to the embodiment illustrated in FIG. 1 have been manufactured in which the cables of the first turn-down carcass ply 13 were oriented at 78° with respect to the mid-circumferential plane CP, the cables of the second carcass ply 14 were oriented at 79° with respect to the mid-circumferential plane CP, and the cables of the third carcass ply 15 were oriented at 80° with respect to the mid-circumferential plane CP, all of the cables of all of the carcass plies being inclined in the same sense with respect to the mid-circumferential plane.

While certain representative details and embodiments have been shown and described for the purpose of illustrating the invention, it will be apparent to those skilled in the art the various changes and modifications may be made therein without departing from the spirit or the scope of the invention.

We claim:
1. A pneumatic tire comprising:
(a) a pair of axially spaced apart annular beads; and

(b) at least three carcass plies each of which extends between said beads and is folded thereabout, said carcass plies being adjacent to one another in both a crown region and sidewall portion of the tire, each said carcass ply comprising side-by-side cables comprising aramid filaments, each pair of next adjacent carcass plies in said tire characterized by the cables of the radially innermost carcass ply of said pair intersecting a mid-circumferential centerplane of the tire at a first angle in the range of 75° to 105° and the cables of the radially outermost carcass ply of said pair intersecting said mid-circumferential centerplane at a second angle in the range of 75° to 105°, said second angle being nearer to 90° than said first angle, and the included angle between said first and second angles being not greater than 10°.

2. A pneumatic tire suitable for use on an aircraft wherein said tire comprises:

(a) a pair of axially spaced apart annular beads; and (b) at least three carcass plies each of which extends between said beads and is folded about each of the beads each said carcass ply comprising side-by-side cables with each said cable consisting of aramid filaments, each pair of next adjacent carcass plies characterized in that the cables of the radially innermost carcass ply of said pair intersect a mid-circumferential plane of the tire at a first angle in the range of 80° to 100° and the cables of the radially outermost carcass ply of said pair intersect said mid-circumferential centerplane at a second angle in the range of 80° to 100°, said second angle being closer to 90° than said first angle and the included angle between said first and second angles being not greater than 10°.

3. A pneumatic tire suitable for us on an aircraft according to claim 2 wherein at least one of said carcass plies is a turn-down ply and at least one of said carcass plies is a turn-up ply.

* * * * *